United States Patent [19]
Bowen et al.

[11] 3,769,117
[45] Oct. 30, 1973

[54] LASER WELDING PLASTIC TUBES

[75] Inventors: William Edmund Bowen, Trenton; Clifford Clayton Goehring, Princeton, both of N.J.

[73] Assignee: American Can Company, Greenwich, Conn.

[22] Filed: Dec. 30, 1971

[21] Appl. No.: 214,311

[52] U.S. Cl. .................................. 156/69, 156/272
[51] Int. Cl. ...................... B29c 27/00, B29c 19/02
[58] Field of Search ............................. 156/272, 69

[56] References Cited
UNITED STATES PATENTS
3,128,215  4/1964  Hood et al. ......................... 156/69
3,700,513  10/1972  Haberhauer et al. ............... 156/272
3,560,291  2/1971  Foglia et al. ....................... 156/272

OTHER PUBLICATIONS
Modern Plastics; Vol. 46, No. 5, May 1969 p. 71–74.

*Primary Examiner*—Douglas J. Drummond
*Attorney*—Robert P. Auber et al.

[57] ABSTRACT

A method of welding a plastic end member to an unstepped, plastic tubular body which comprises positioning the end member within the body and then irradiating the area to be welded with a laser beam for a specified time sufficient to achieve the desired weld while simultaneously imparting relative rotational motion between the beam and the area to be welded.

8 Claims, 5 Drawing Figures

PATENTED OCT 30 1973          3,769,117

LASER WELDING PLASTIC TUBES

BACKGROUND OF THE INVENTION

The present invention relates to laser welding plastic end members to unstepped, plastic, tubular bodies, and more particularly to high speed welding of plastic squeeze tube heads to plastic bodies (sleeves).

Existing techniques for forming both rigid and flexible plastic containers include vacuum forming, injection molding and blow molding, among others. One present method for forming squeeze tubes comprises injection molding the head onto the tubular body (U.S. Pat. No. 3,047,910). In another method a portion of the pre-formed head is held in proximity to the body and molding apparatus is placed around both the head and the body. Plastic injection molded into the area between the head and body forms the remaining part of the head and joins the pre-formed head to the body (U.S. Pat. No. 3,356,263).

Still another method involves the assembling of a head and body, applying heat to the margins of the head and body where they are to be joined to permit formation of beads, and then forming of the heated margins (beads) by sliding dies over the beads until the margins are cool enough to maintain the prescribed, unbeaded die shape (Makowski's U.S. Pat. No. 3,144,495).

In the above processes, there are presented several problems which are overcome by the present invention. In injection molding techniques, the speed of production is reduced owing to the time required for injection and cooling down of the plastic. Where dies or forming cavities must be brought into alignment with mating parts, precision of the dies and parts and their motion becomes a critical factor. In the present invention, a minimum amount of material is heated to achieve welding of the end member and body, thereby allowing production rates to be increased substantially. Little or no forming is required in the present invention owing to the precise nature of the welding process, adding further to the speed and efficiency of production. The instant invention is a distinct improvement over the Makowski process, since it does not require any additional step to form a smooth, unbeaded container as no beads are initially created.

SUMMARY OF THE INVENTION

The present invention teaches a method of laser welding a plastic end member to an unstepped, plastic tubular body, and comprises the steps of positioning the end member within the body and then irradiating the area to be welded with a laser beam for a specified time sufficient to achieve the desired weld while simultaneously imparting relative rotational motion between the beam and the area to be welded.

DESCRIPTION OF THE PREFERRED EMBODIMENT

Figure 5:
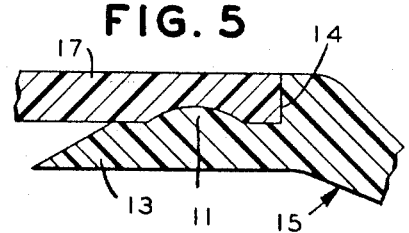
FIG. 5 is a partial enlargement of FIG. 4 showing the locking action between the sleeve and squeeze tube head.

In the preferred embodiment of the instant invention, the end member is a polyethylene squeeze tube head 15 having a shoulder 14 and a skirt 13, while the tubular body is a polyethylene sleeve 17 (see FIG. 5). The source of energy for implementing this invention is the laser, which is a form of light amplifier that produces a highly collimated beam of intense radiation. The energy is essentially monochromatic, i.e., one wavelength. The wavelength will depend upon the particular lasing medium utilized and can range from the ultraviolet to the far infrared. Presently, the two most valuable lasers for commercial applications requiring a continuous high power beam are the Carbon Dioxide ($CO_2$) Gas Laser, wavelength 10.6 microns, and the Neodymium-YAG Laser, wavelength 1.06 microns. $CO_2$ and Nd-YAG lasers are available with output powers from a fraction of a watt to several hundred watts, and their beams can be focused to a few thousandths of an inch or less. It has been found that powers in the range of 100 to 200 watts are satisfactory for plastic welding with a $CO_2$ laser.

Of primary importance in achieving a reliable weld having an appearance effecting high consumer acceptance is the control of the temperature gradient in the members to be welded. The gradient will depend on the intensity and directivity of the radiant energy as well as on the absorption and thermal characteristics of the material to be welded. The absorption of the beam by the plastic being irradiated will depend on the absorption constant of the material at the wavelength of the irradiating beam. Since temperature is proportional to beam intensity, the temperature gradient of the irradiated material will follow approximately the exponential absorption law $I = I_o e^{-\alpha d}$, which gives the beam intensity (power per unit area) I at a distance d from a surface receiving incident beam intensity $I_o$ for a material with an absorption coefficient $\alpha$.

Figure 1:
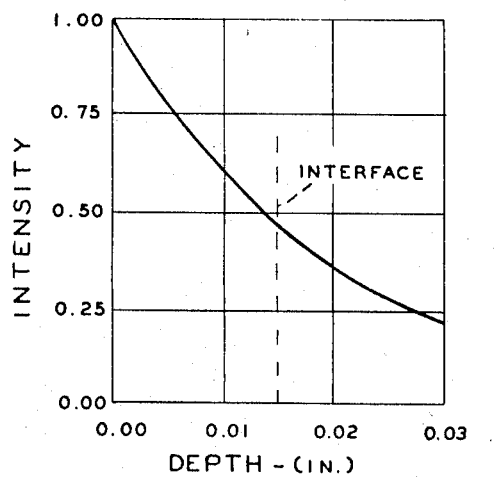
FIG. 1 is a graph of the beam intensity and approximate temperature profile in 0.030 inch thick polyethylene irradiated with a 10.6 microns wavelength laser beam.

Applying the exponential absorption law, the plot in FIG. 1 shows the approximate temperature profile in 0.030 inch thick polyethylene when it is irradiated with a 10.6 micron wavelength beam. The area closest to the incident surface receives the greatest energy since the beam has not been attenuated by increments of thickness. The beam penetration (and thus the steepness of the temperature gradient) is a function of the absorption constant $\alpha$. The temperature at and near the incident surface is therefore higher than at the interface of the two 0.015 inch layers indicated by the dotted line in FIG. 1.

Since plastics are generally poor thermal conductors, the heating is very localized. It is essential that temperature rise in the plastic and particularly at its surface does not reach a value that will cause degradation or excessive flow of material. On the other hand, if a weld or fusion of materials is to be accomplished at an interface, such as at a 0.015 inch depth as in FIG. 1, the temperature in that area must rise to the melting point of the material.

Experiments with low density polyethylene tubular bodies 0.014 inch thick, and polyethylene heads inserted into the bodies have shown that deformation can occur at the outer surface of the body when sufficient energy is supplied to fuse the body and head during one revolution of the work piece. The radiation was from a $CO_2$ laser focused to a 0.030 inch spot diameter and having an intensity of 0.17 megawatts per square inch. Difficulty was also encountered in timing precisely the exposure necessary to complete exactly one revolution so that no overlap of the weld would occur which would further deform the surface. Consequently, the laser apparatus was adjusted to rotate the workpiece at several times the initial speed, while the exposure time was held constant, so that the weld area passed under the beam several times at a proportionally higher speed. In affect, less energy per increment of time was delivered to a given spot, but the same energy was delivered in the total exposure interval. A good weld was produced with significantly less deformation of the outer surface and a less clearly defined overlap area.

It was found that placement of idler rollers against the weld area was advantageous in some cases. It is obvious that these would have a smoothing effect on the weld, but, more important was their action in cooling the outer surface of the body. Conductive rollers such as aluminum aided in cooling the surface on each rotation after beam irradiation.

The above improvements in appearance can be explained by referring to the earlier discussion and the graph of FIG. 1. By supplying energy to the weld area at a rate and duration that will not cause degradation and by allowing surface cooling between periods of irradiation, the inner layer of several layers of plastic can be heated to their fusion temperature with minimal surface deformation. The technique of multiple exposure and roller cooling tends to flatten the temperature gradient peak at the near surface without significantly affecting the interior temperature.

Figure 2:
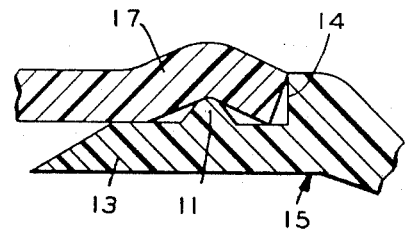
FIG. 2 is an enlarged, fragmentary, vertical, sectional view of the squeeze tube head and sleeve before laser welding.

In thermal bonding, pressure is usually an important parameter, and in many plastic heat sealing methods it is necessary, beacause heat for sealing is supplied to the plastic from a hot roller or platen from a hot roller or platen contacting the workpiece. The pressure aids heat transfer by conduction and aids fusion by forcing together the members to be welded. The laser beam can generate heat within the members to be welded without contact, which is ideal for high speed fabrication. However, it is necessary that the interface of the members to be welded be in as intimate contact as possible to reduce the amount of melting required to fuse the members. To fulfill this requirement, an interference fit between the members to be welded is recommended. Such a fit would result where the outer diameter of the skirt 13 is greater than the inner diameter of the sleeve 17. This type of fit produces relative pressure between the members without contact of an external element. A variation of the interference fit is shown in FIG. 2, wherein a raised ridge 11 is formed in the skirt 13 of the head 15, so that the larger diameter of the raised ridge 11 creats pressure against the sleeve 17. The ridge 11 serves several functions. First, it produces pressure contact between the head 15 and the sleeve 17. Second, it provides additional material in the weld area to compensate for reduction in the thickness of the sleeve 17 that may result from shrinkage due to heating. Third, the projection of the raised ridge 11 into the sleeve 17 yields a locking type action when the material of the body 17 flows around the ridge 11. (See FIG. 5).

Figure 3:
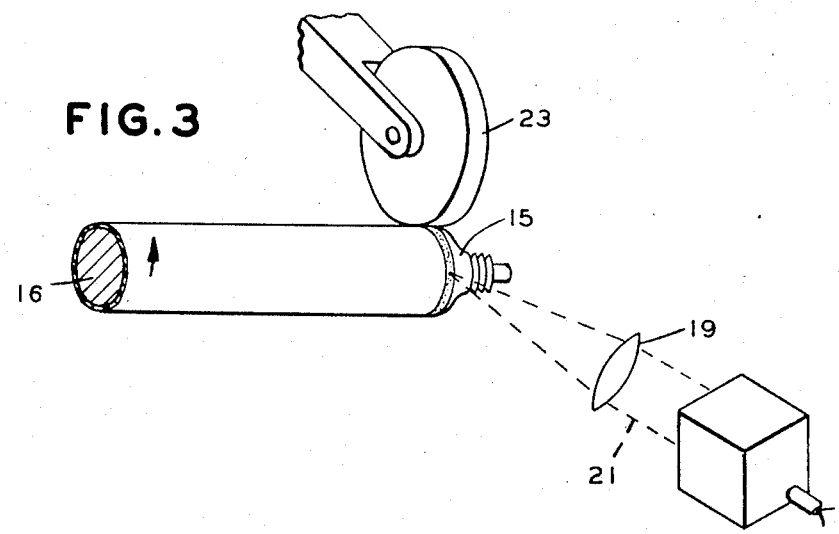
FIG. 3 is a perspective view of the squeeze tube head being laser welded to the sleeve.

FIG. 3 shows representative apparatus for implementing the method of this invention. The sleeve 17 and the head 15 are assembled on a rotating mandrel 16 and positioned so that the area to be welded is near the focus of a lens 19 that intercepts a laser beam 21. A pressure roller 23 is employed to remove heat and smooth the surface of the weld, but is not essential, especially with high density polyethylene.

Figure 4:
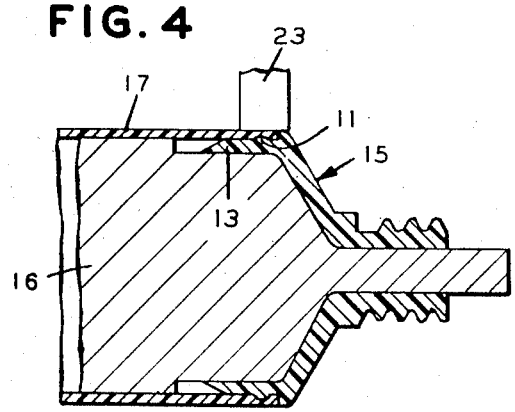
FIG. 4 is an enlarged, fragmentary, vertical, sectional view of the sleeve and squeeze tube head subsequent to the laser welding operation.

In order to weld the sleeve 17 and the head 15 in the manner of this invention, it is preferred that the radiant energy pass through the most proximate layer of material, being the sleeve 17 in this case, and penetrate to the juncture of the sleeve 17 and head 15. This technique was utilized together with apparatus similar to that shown in FIG. 3 to weld a 0.875 inch diameter sleeve having a wall thickness of 0.014 inches to the skirt of a head (see FIG. 4). Sleeves and heads of both low and high density polyethylene, both clear and pigmented, were used. Laser power was 125 watts focused to a 0.030 inch diameter spot at the weld area. The sleeves (and heads in turn) were rotated by a mandrel at 1,500 revolutions per minute and the laser beam was turned on for 0.28 seconds, the equivalence of seven revolutions of sleeve and head. The finished squeeze tubes held 40 p.s.i. of air pressure without leaking.

It should be noted that when materials are semi-transparent to the irradiation wavelength being used, some amount of energy, depending on the total thickness of the material, will travel through and exit at the rear surface. A reflective backing at the rear surface can re-direct the exiting energy back through the material to gain greater utilization of the irradiating beam, and thereby further flatten the energy distribution curve. For the present invention, the underlying surface is usually a workpiece holder or mandrel. The surface of this fixture below the weld area should be polished to produce maximum reflection.

Another means has been confirmed to improve weld penetration in plastic sheet while producing less surface deformation. In this method, the circular beam spot pattern is shaped by special focusing so that its dimensions along the weld path is increased while the width remains constant. The energy density of the focused beam is thus reduced since the same power is spread over a larger area, but the work per unit length does not change because the weld width has not been increased. Such beam elongation can be accomplished by employement of cylindrical or other special lenses, mirrors, or by utilization of off-axis astigmatism.

It should be noted that it is not necessary that the laser beam pass through the most proximate layer of material. It is possible that the beam could pass through an interior layer of material (i.e., from the inside to the outside) by means of special apparatus and manipulation of the workpiece. Such a technique would be useful where metal laminates are being welded.

Although the invention has been described in reference to cylindrical tubes, it is also quite applicable to oval shaped tubes.

It is thought that the invention and many of its attendant advantages will be under stood from the foreqoing description and it will be apparent that various changes may be made in the form, construction and arrangement of the parts of the article and that changes may be made in the steps of the method described and their order of accomplishment without departing from the spirit and scope of the invention or sacrificing all of its material advantages, the form hereinbefore described being merely a preferred embodiment thereof.

What is claimed is:

1. A method of welding a plastic end member to an unstepped, plastic tubular body, comprising:
   positioning the end member within the body in substantially the same relative position desired in the finished article;
   irradiating the area to be welded with laser beam for a fraction of a second sufficient to achieve the desired weld while a mandrel simultaneously imparts relative rotational motion of at least 360° between the beam and the area to be welded.

2. The method of claim 1 wherein said end member is a squeeze tube head and said body is a sleeve.

3. The method of claim 2 wherein the outer diameter of the skirt of said head is greater than the inner diameter of the sleeve, thereby producing an interference fit between the head and sleeve.

4. The method of claim 3 wherein the laser beam has a wavelength of 10.6 microns.

5. The method of claim 4 wherein the laser beam is elongated in the direction of the weld path.

6. The method of claim 5 wherein the head and sleeve are both polyethylene.

7. The method of claim 1 wherein the fraction is about one-fourth.

8. The method of claim 7 wherein the rotational motion consists of about seven revolutions of the end member and body relative to the beam.

* * * * *